US006546421B1

(12) United States Patent
Wynblatt et al.

(10) Patent No.: US 6,546,421 B1
(45) Date of Patent: Apr. 8, 2003

(54) SYSTEM AND METHOD FOR AUTOMATIC SELECTION OF INTERNET DATA STREAMS

(75) Inventors: Michael Wynblatt, Pleasant Hill, CA (US); Brent Baxter, Plainsboro, NJ (US)

(73) Assignee: Siemens Corporate Research, Inc., Princeton, NJ (US)

(*) Notice: Subject to any disclaimer, the term of this patent is extended or adjusted under 35 U.S.C. 154(b) by 0 days.

(21) Appl. No.: 09/345,207

(22) Filed: Jun. 30, 1999

(51) Int. Cl.[7] .............................................. G06F 15/173
(52) U.S. Cl. ....................................... 709/225; 707/501
(58) Field of Search ................................. 709/203, 217, 709/232, 200, 226, 204, 218, 227, 224, 219, 225; 707/501, 6, 5, 10, 3, 100; 708/300; 705/27, 1; 717/131; 706/12

(56) References Cited

U.S. PATENT DOCUMENTS

| | | | | |
|---|---|---|---|---|
| 4,931,928 A | * | 6/1990 | Greenfeld | 717/131 |
| 5,704,017 A | * | 12/1997 | Heckreman et al. | 706/12 |
| 5,721,827 A | * | 2/1998 | Logan et al. | 709/217 |
| 5,732,216 A | * | 3/1998 | Logan et al. | 709/203 |
| 5,864,848 A | * | 1/1999 | Horvitz et al. | 707/6 |
| 5,913,215 A | * | 6/1999 | Rubinstein et al. | 707/10 |
| 5,983,220 A | * | 11/1999 | Schmitt | 707/5 |
| 6,014,638 A | * | 1/2000 | Burge et al. | 705/27 |
| 6,021,419 A | * | 2/2000 | Clark, Jr. et al. | 708/300 |
| 6,026,400 A | * | 2/2000 | Suzuki | 707/6 |
| 6,041,303 A | * | 2/2000 | Mathews | 705/1 |
| 6,047,327 A | * | 4/2000 | Tso | 709/232 |
| 6,055,566 A | * | 4/2000 | Kikinis | 709/219 |
| 6,085,219 A | * | 7/2000 | Moriya | 709/200 |
| 6,092,100 A | * | 7/2000 | Bertis et al. | 709/203 |
| 6,199,076 B1 | * | 3/2001 | Logan et al. | 707/501 |
| 6,209,027 B1 | * | 3/2001 | Gibson | 709/218 |
| 6,279,030 B1 | * | 8/2001 | Britton et al. | 709/203 |
| 6,314,427 B1 | * | 11/2001 | Goldman et al. | 707/100 |
| 6,353,823 B1 | * | 3/2002 | Kumar | 707/3 |
| 6,353,929 B1 | * | 3/2002 | Houston | 725/20 |
| 6,493,758 B1 | * | 12/2002 | McLain | 709/227 |

OTHER PUBLICATIONS

Li et al, WebDB: A Web Query System and its Modeling, language and Implementation, IEEE 1998.*
Ding et al, Centralized Content–Based Web Filtering and Blocking: HOw far Can it go?. IEEE 1999.*
Zahedi et al, Traffic Engineering for the Wireless LAN Access Point, IEEE 1998.*

* cited by examiner

Primary Examiner—Mark Powell
Assistant Examiner—Thong Vu

(57) ABSTRACT

A system and method for providing automatic and continuous selection of user-preferred data streams based on pre-defined parameters. In one aspect of the present invention, a client/server system comprises: a sever comprising an address list including addresses of a plurality of data sources; and a client comprising a list of user preferences; means for accessing the server to obtain the address list; means for accessing at least a first data source of the plurality of data sources on the address list to obtain descriptive information; evaluation means for evaluating the descriptive information and the user preferences to select at least a second data source of the plurality of data sources based on the evaluation; and means for accessing the second data source. In one exemplary embodiment of the present invention as applied to Internet radio stations, a user would be allowed to listen only to songs from his list of favorites. In another exemplary embodiment as applied to Internet sporting events, a user can hear the most exciting parts of one or more current sporting events. In another exemplary embodiment as applied to industrial process monitoring, a remote user could ensure that he would always see any data stream that had anomalous readings.

18 Claims, 3 Drawing Sheets

SYSTEM AND METHOD FOR AUTOMATIC SELECTION OF INTERNET DATA STREAMS

BACKGROUND

1. Technical Field

The present application relates generally to a system and method for accessing information and, more particularly, to a system and method for providing automatic and continuous selection of user-preferred Internet data streams using predefined parameters.

2. Description of Related Art

Currently, the accessing of multimedia data streams over the Internet from remote servers has become increasingly popular. For example, video data streams (video streaming) is a sequence of moving images that are typically transmitted in compressed form over the Internet, with each moving image in the sequence being displayed on a host computer monitor as it arrives. In addition, data streams having only audio or a combination of video and sound are referred to as streaming media. With streaming video or streaming media, the user does not have to wait to download a large file before seeing a video and/or hearing the sound. For Internet data streams, the client/server multimedia presentation control protocol RTSP (Real Time Streaming Protocol) has been developed for transmitting streamed multimedia over IP (Internet Protocol) networks. In addition, RTP (Real Tire Transport Protocol) is a packet format for multimedia data streams which is used by the RSTP for the data portion of the RSTP.

Referring to FIG. 1, a diagram illustrates a conventional system 10 for connecting to a desired one of a plurality of data stream servers 11 over the Internet 12. Such a connection is often made through a firewall proxy 13, to ensure the security of, e.g., various hosts 14 of a LAN (local area network). Once a local host 14 establishes connection (via the Internet infrastructure 12) to a desired data stream server 11, the data stream server 11 transmits a continuous stream of data packets to the local host computer 14 to be processed. Such data streams are often used for sending audio and video data, and the processing at the local computer 14 is actually data rendering. In this way, users can view or listen to audio and video sequences that are downloaded from the Internet. The data streams may also be numerical or text data, such as a news ticker or data from a process monitoring system.

Accessing a desired data stream using the conventional system of FIG. 1 typically requires a user to manually enter or select a URL of one or more desired web sites before even knowing the current contents of such web sites. For instance, the user must manually search the Internet to download data streams of desired songs. Even when the user finds a desired data stream, the constant repetition of manually searching for user-preferred data streams can be burdensome and time consuming for the user. Accordingly, a system is desired that can automatically and continuously connect to user-preferred data streams thereby allowing a user to, e.g., listen to preferred songs off the Internet on a continuous basis.

SUMMARY OF THE INVENTION

The present invention is directed to a system and method for providing automatic and continuous selection of user-preferred data streams based on predefined parameters. In one aspect of the present invention, a client/server system comprises:

a sever comprising an address list including addresses of a plurality of data sources; and a client comprising a list of user preferences; means for accessing the server to obtain the address list; means for accessing at least a first data source of the plurality of data sources on the address list to obtain descriptive information; evaluation means for evaluating the descriptive information and the user preferences to select at least a second data source of the plurality of data sources based on the evaluation; and means for accessing the second data source.

In another aspect of the present invention, a method for automatically accessing preferred data streams comprises the steps of:

accessing an address list from a server, the address list comprising addresses of a plurality of data sources;

accessing each of the plurality of data sources using the addresses;

extracting relevant information from each of the accessed data sources;

evaluating the extracted information to select a first preferred data source; and accessing at least one information data stream that is associated with the first preferred data source.

In one exemplary embodiment of the present invention as applied to Internet radio stations, a user would be allowed to listen only to songs from his list of favorites. In another exemplary embodiment as applied to Internet sporting events, a user can hear the most exciting parts of one or more current sporting events. In another exemplary embodiment as applied to industrial process monitoring, a remote user could ensure that he would always see any data stream that had anomalous readings.

These and other aspects, features and advantages of the present invention will be described and become apparent from the following detailed description of preferred embodiments, which is to be read in connection with the accompanying drawings.

DETAILED DESCRIPTION OF PREFERRED EMBODIMENTS

Figure 1:
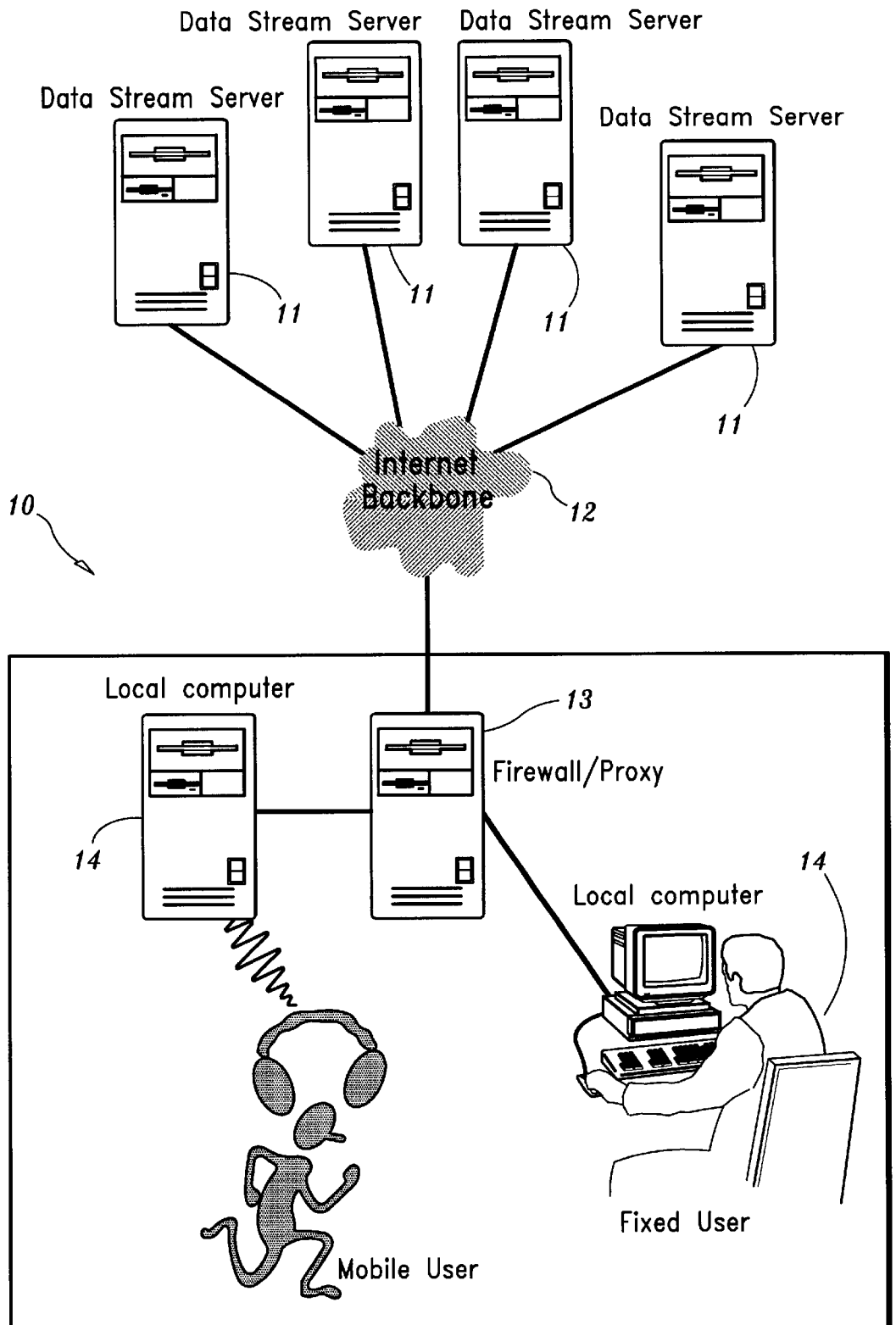
FIG. 1 is a diagram illustrating a conventional system for providing access to remote data stream servers.
Figure 2:
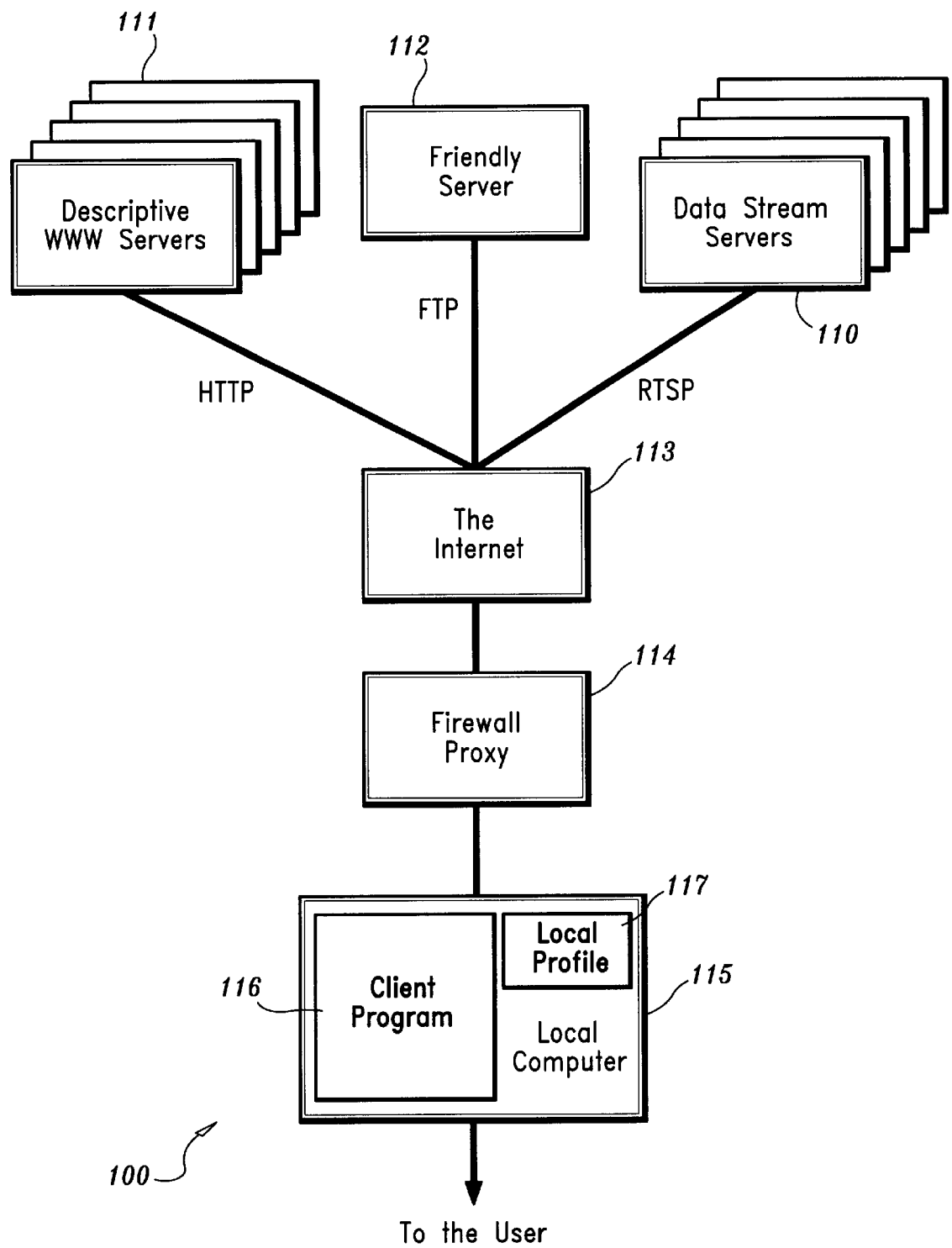
FIG. 2 is a diagram illustrating a system for providing continuous automatic selection of user-preferred data streams from remote servers in accordance with an embodiment of the present invention.

Referring now to FIG. 2, a diagram illustrates a system for providing continuous automatic selection of user-preferred data streams from remote servers in accordance with an embodiment of the present invention. The system 100 comprises one or more data stream servers 110 having various data streams that are accessible by a local computer 115, for example, over the Internet 113 using RTSP and similar protocols known by those skilled in the art. The system 100 also comprises one or more "descriptive" servers 111 (e.g., WWW (World Wide Web) servers) each having "descriptive pages" (e.g., WWW documents). In an exemplary embodiment, the descriptive pages may be static documents in HTML (Hypertext Markup Language) format, documents in XML (Extensible Markup Language) format, documents that are dynamically generated via CGI (Common Gateway Interface) or ASP (Active Server Page) applications, or any other type of structured web document. As explained in greater detail below, the descriptive pages are used for conveying information regarding the content of one or more corresponding data streams of the data stream servers 110. Each descriptive page is assigned, e.g., a URL (Uniform Resource Locator) which serves to indicate the location of the document (i.e., the document's address). Using the URLs, the descriptive pages of the descriptive servers 111 can be accessed via the local computer 115 through HTTP (Hypertext Transfer Protocol).

The system further comprises a "friendly server" 112 that comprises a list of addresses of various data sources (e.g., the Internet address of the data stream servers 110 and the descriptive servers 111) that are relevant for a given application. In an exemplary embodiment, the friendly server 112 comprises an address file that includes the URLs for each of the relevant data streams and descriptive pages. The friendly server 112 further comprises an FTP (File Transfer Protocol) server (of a conventional type) through which the address file may be made available co a client program 116 of the local computer 115 over the Internet 113. Moreover, the client program 116 comprises an FTP client (of a conventional type) that can be used to access the address file of the friendly server 112.

The heart of the system 100 is the client program 116 which is preferably implemented in software as an application program tangibly embodied on a program storage device. The client program 116 can be uploaded to, and executed by the local computer 115 or any other device or machine comprising a suitable architecture. As shown in FIG. 2, the client program 116 is executed on the local computer 115. The local computer 115 includes hardware such as one or more central processing units (CPU), a random access memory (RAM), and input/output (I/O) interface(s). The local computer 115 also includes an operating system and microinstruction code. The various processes and functions described herein may either be part of the microinstruction code or part of the application program (or a combination thereof) which is executed via the operating system.

The client program 116 can communicate (through an optional firewall proxy server 114) with the data stream, descriptive, and friendly servers 110, 111, 112, using the respective protocols RTSP, HTTP and FTP. The local computer 115 comprises a local profile module 117 that contains personal preferences (predefined parameters) of the user, which are accessed and processed by the client program 116 and local computer 115 during the process of selecting user-preferred data streams (as discussed in greater detail below).

Figure 3:
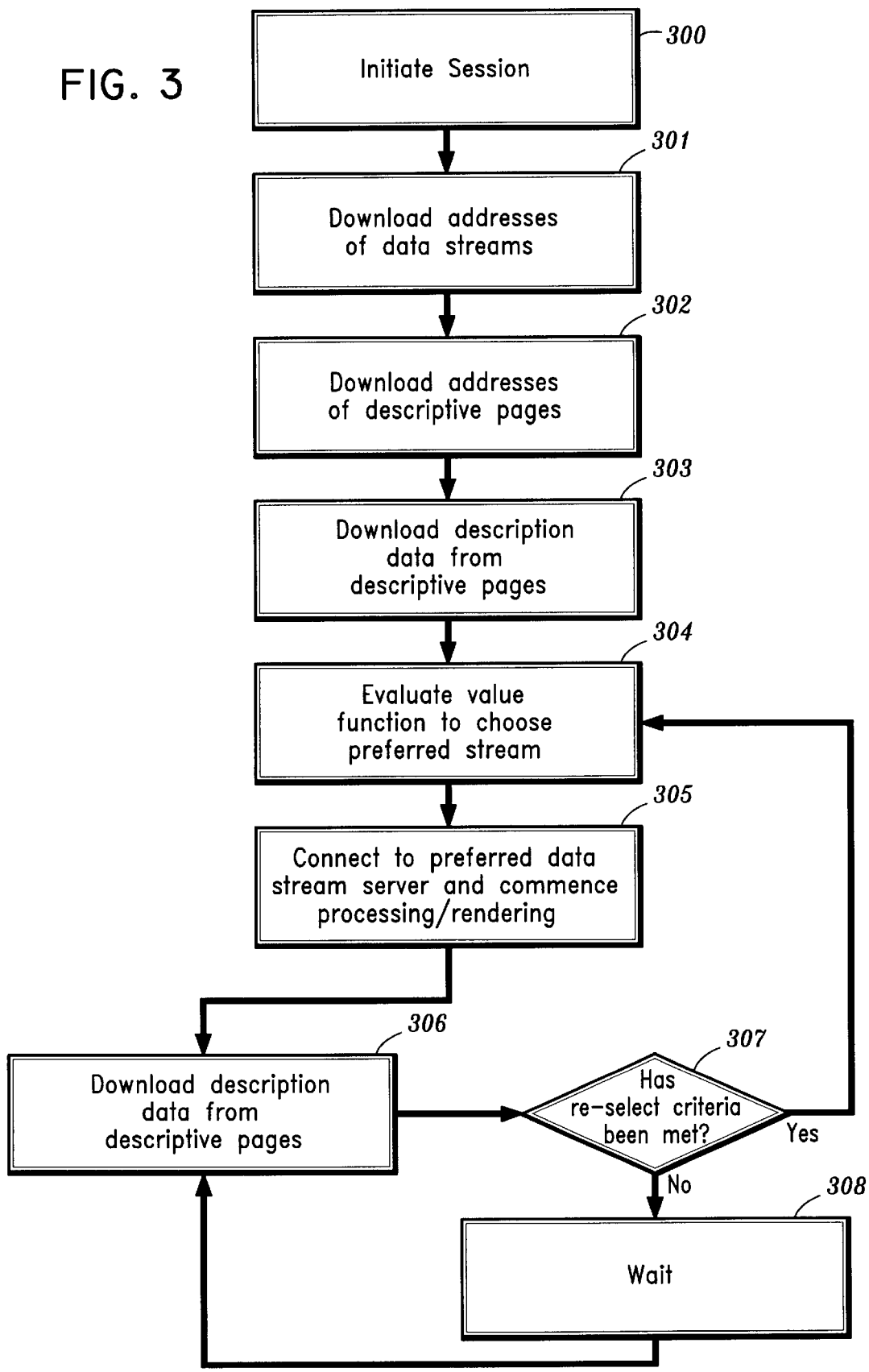
FIG. 3 is a flow diagram of a method for providing continuous automatic selection of user-preferred data streams from remote servers in accordance with one aspect of the present invention.

A detailed description of a method of operation of the system of FIG. 2 will now be provided with reference to the flow diagram of FIG. 3, which illustrates method for providing continuous automatic selection of user-preferred data streams from remote servers in accordance with one aspect of the present invention. In addition, the method depicted in FIG. 3 will be described in relation to several exemplary embodiments of the present invention (although it should be understood that such embodiments are not to be construed as limiting the scope of the invention). For example, in one illustrative embodiment referred to herein as the "Automatic Highlights Monitor," a user can automatically obtain data streams of audio and video broadcasts of desired sporting events (such as baseball games) from remote data stream servers. In another illustrative embodiment referred to herein as the "Internet Personalized Music System," a user can automatically obtain audio broadcasts of desired musical audio streams (such as songs) from remote data stream servers.

It is to be understood that because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Referring now to FIG. 3, a user will initiate a session with the client program 116 using the local computer 115 (step 300) so as to automatically obtain one or more preferred data streams. The client program 116 then accesses the friendly server 112 to download addresses of various data sources. For instance, the client program connects to the friendly server 112 using FTP and downloads (into its local memory) the current address file comprising the URLs of data streams of the data stream servers 110 (step 301) and descriptive pages of the descriptive servers 111 (step 302). Optionally, this operation may be repeated at the request of the user, as a "refresh."

It is to be appreciated that the friendly server 112 preferably comprises suitable algorithm(s) for automatically updating the address file with appropriate addresses (e.g., URLs) that are relevant to the given application. Alternatively, the address file may be maintained and updated manually by an operator of the friendly server 112. This address file updating feature advantageously addresses the concern that Internet addresses of the data streams and descriptive pages can change on a regular basis, especially for transient data such as audio programs. For example, data streams that are relevant to the exemplary "Automatic Highlights Monitor" system may be broadcasts of live major league baseball games in, e.g., RealMedia format. Since the addresses or URLs of such data streams are typically changed on a per game basis, these addresses are preferably automatically updated by the friendly server 112 each time a new ball game begins. In addition, the corresponding descriptive pages (e.g., the game status pages provided by such services as ESPNet and CBS Sportsline) are preferably updated for each game.

On the other hand, the addresses of data streams that are relevant to the exemplary "Internet Personalized Music System" (e.g., Internet audio streams in RealAudio format that are provided by commercial or amateur "Internet radio stations"), as well as the corresponding descriptive pages (e.g. web pages of the Internet radio stations), change infrequently. Consequently, such addresses typically need to be updated every few weeks.

Referring again to FIG. 3, after the data source addresses are downloaded (steps 301 and 302), the client program 116 uses such addresses to send HTTP requests to download descriptive pages from the descriptive servers 111 (step 303). As explained above, the descriptive pages serve to convey information about the content of one or more corresponding data streams on the data stream servers 110. This "descriptive" information can either be in a complex format or in a format as simple as a title or description of the current content of the data stream. In any event, it is preferred that such information (of the descriptive pages) be provided in a compatible predefined format, so that client program 116 can readily extract the relevant information from the descriptive page after it is downloaded. It is to be understood that descriptive pages could also comprise extraneous information, as long as relevant information is recognizable by the client program 116.

The function of descriptive pages is best illustrated in relation to the illustrative embodiments described herein. By way of example, descriptive pages that are relevant to the "Internet Personalized Music System" (e.g., web pages of Internet radio stations) preferably include at least the title and artist of a currently playing musical piece in any standard format recognizable by the client program 116. Again, this information may be included in a more complex document format, such as a program schedule of a given Internet radio station, as long as the standard format is identifiable by the client program 116. An exemplary format can be as follows:

Title: piece title. Artist: artist wherein this format is located by itself on a single line of the file (associated with the descriptive page). As such, irrelevant information on the descriptive page can then be ignored.

In addition, descriptive pages that are relevant to the "Automatic Highlights Monitor" (e.g., web pages of news organizations or baseball clubs) can provide information regarding, for instance, the state of a current baseball game. In this example, an exemplary standard format can include information such as the score (for each team), the current inning, the current batter, the current pitcher, the number of outs, and the number of runners on base, using a standard HTML format with which the client program 116 is familiar, such as follows:

```
<table>
<tr>
    <td> Team1   Score </td>
    <td> Team2   Score </td>
</tr>
<tr>
    <td> [Bottom | Top] of the inning number_number </td>
    <td> outs out </td>
    <td> runners runners on base </td>
</tr>
<tr>
    <td> At Bat : PlayerName </td>
    <td> Pitching : PlayerName </td>
</table>
```

Again, this information may be provided in a more complex web page or description of the game status, as long as the relevant information is provided in a format which is recognizable by the client program 116.

After the descriptive pages have been downloaded and the relevant information extracted from such pages (associated with the data streams) (step 303), the next step performed by the client program 116 is to apply a Value Function to the extracted information so as to initially select the most preferred data stream (step 304). The Value Function is an application-specific function that depends on the given application. The Value Function is applied once for each data stream under consideration, and the data stream which gets the highest resulting value is selected for download. More specifically, each set of information extracted from each descriptive page, as well as any information in the local profile 117, is evaluated by the Value Function to determine the most user-preferred data stream. After the preferred data stream is chosen, the local profile 117 may be updated (as explained in further detail below).

The Value Function and its operation will now be explained in further detail as it relates to the exemplary embodiments described herein. For instance, with respect to the "Internet Personalized Music System," the user would preferably have previously built a local profile 117 comprising a list of user-preferred musical pieces (e.g., songs). The songs in the list would be ordered (or indexed) based on the user's preference. A Value Function F can be defined over two variables, Index and Elapsed, wherein the variable Index refers to the index of the given piece in the user's local profile 117 (the variable can be set to 0 (zero) if the piece is not in the list), and the variable Elapsed refers to a time that has elapsed since the given piece was last played to the user (which is preferably set to a maximum of 720 hours). Pieces that have never been played are preferably set to an Elapsed value of 1200. Based on the above, the Value Function F can be defined as follows:

$$F(Index, Elapsed) = 0 \text{ if Index} = 0,$$

Else $$Elapsed - (2*Index)$$

After the information is extracted from the descriptive pages, the client program 116 can determine if one or more pieces (e.g., being currently played on a data stream) corresponds to a preferred piece listed in the user profile 117. The Value Function is applied to all preferred active pieces, and the data stream of the piece having the highest score (which may be negative) is selected for download. The local profile 117 may be subsequently updated by the client program 116 to include the most recent time that a particular piece has been played (downloaded) to set, for example, the Elapsed variable.

Next, with respect to the exemplary "Automatic Highlights Monitor" embodiment, a Value Function F can be based on 9 variables that are determined based on the information extracted from the descriptive page, as well as a previously constructed local profile 117. The local profile 117 for this illustrative embodiment comprises two lists of paired values. The first is a list of, e.g., preferred ball players, as well as a corresponding "excitement" rating for each of the preferred players. The excitement rating is preferably a floating point value between 0 and 1. For example, the user might rate a star player. 0.9, less preferred player 0.1. It is to be understood that not every ball player has to be listed in the profile; absent players can automatically be assigned a default score by the client program 116. The second list in the user profile 117 is preferably a list of preferred teams, as well as a corresponding "excitement" rating for each team. The excitement rating is preferably a floating point value scored between 0 and 1. For example, the user might rate his/her favorite team a 1.0, and another first place team a 0.7.

In an illustrative embodiment, a first variable of the value function F can be Differential which refers to the game score differential computed as the absolute value of (score1−score2) (the scores as extracted from the descriptive pages). A second variable can be PotentialLeadChange, which is 1 if the score is tied or if the trailing team is batting, and 0 otherwise. A third variable can be InningNumber, which is the inning number of a ball game (as extracted from the descriptive page). A fourth variable can be Outs, which is the number of outs in the inning (as extracted from the descriptive page). A fifth variable can be Runners, which is the number of runners on base (as extracted from the descriptive page). A sixth and seventh variable can be ExcitingTeam1 and ExcitingTeam2, which refer to the excitement rating associated with the preferred teams Team1 and Team2 based on the information of the user's local profile 117. An eighth and ninth variable can be ExcitingBatter and ExcitingPitcher, which refer to the excitement ratings associated with the current batter and current pitcher in the user's local profile 117. Note that in the above embodiment, batters and pitchers are not distinguished in the local profile, but are considered "players".

Based on the above, a Value Function F can be defined as follows:

$$F(\ldots) = ((100-\text{Differential}*10) + 10*\text{PotentialLeadChange}*(10-\text{Differential}-\text{Runners})) + (\text{Runners}+\text{Outs})*(\text{ExcitingBatter}+\text{ExcitingPitcher})*10)*(\text{InningNumber}/3)*(\text{ExcitingTeam1}+\text{ExcitingTeam2}).$$

As explained above, this Value Function is applied to all active games, and the game with the hig.ghest score is chosen as the preferred stream.

Once the most preferred data stream has been selected (based on the scores computed from the Value Function) (step 304), the client program 116 initiates a connection to the corresponding data stream server 110 and requests the data stream (step 305) (if a different data stream was previously opened, it is closed at this time). In particular, the client 116 and server 111 establish a streaming connection using a standard protocol such as RTSP. Once the streaming connection is established, the client 116 begins receiving data and processing the data, which is then output by the local computer 115 as appropriate for the given application. For example, the received data is processed by the client program 116 and output for the user as audio. In other applications, the data stream may be processed and output in both video and audio.

It is to be appreciated that the present invention comprises a manual selection feature which allows either the user or the controlling program to override the automatic selection, and select a specific data stream.

As the selected data stream is being received and processed (step 305), the client program 116 can be programmed to periodically download descriptive pages from the descriptive servers 111 (step 306) and extract the most current information so as to decide whether to re-evaluate the given Value Function and select a new data stream if appropriate. This decision is based on the re-select criteria. The re-select criterion is an application-specific function based on the data of the descriptive pages (which are periodically downloaded. The re-select function is evaluated and a determination is made as to whether re-select criteria has been met (step 307). If the re-select criteria has been met (affirmative result in step 307), the Value Function is re-evaluated and a new stream may be selected. On the other hand, if the re-select criteria has not been met (negative result in step 307), the client program waits for a fixed duration W (step 308), reloads the descriptive data (return to step 306) and then evaluates the re-select function again (step 307). It is to be appreciated that. the re-select function could set to always fail the first time and succeed the second, thereby allowing the value function to be re-evaluated after every W time interval.

The re-select criteria will now be explained in more detail in relation to the illustrative embodiments described herein. For example, with respect to the exemplary "Internet Personalized Music System" embodiment, the re-selection criteria may be based on whether or not the title of the piece being played by the currently active data stream has changed. In particular, the re-select function can be based on a comparison between a previous piece title of the preferred stream with the current piece title of the preferred stream, such that a positive indication is returned if such titles are different. In this way, when the piece ends, a new user-preferred piece is selected from all of the available data streams.

With respect to the exemplary "Automatic Highlights Monitor" embodiment, the re-selection criteria can be based on a determination as to whether or not a current half-inning has ended. In particular, the re-select function can compare a previous inning value with a current inning value, and return a positive indication if such values are different. In this way, when a half-inning ends, the given Value Function can be re-applied to select the most preferred game among the active games.

In summary, the above-described embodiments are illustrative of a system and method in accordance with the present invention for automatically and continuously selecting user-preferred Internet data streams using Internet data and/or user preference data. Exemplary embodiments of the invention (as described above) include an "Automatic Highlights Monitor" that allows a user to listen to, e.g., the most exciting current baseball game, as well as an "Internet Personalized Music System," which selects a data stream of, e.g., a song from those currently available on the Internet.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A client/server system, comprising:
   a sever comprising an address list including addresses of a plurality of data a sources; and
   a client comprising a list of user preferences; means for accessing the server to obtain the address list; means for accessing at least a first data source of the plurality of data sources on the address list to obtain descriptive information; evaluation means for evaluating the descriptive information and the user preferences to automatically select at least a second data source of the plurality of data sources based on the evaluation; and means for accessing the second data source,
   wherein the evaluation means comprises:
   means for extracting predetermined information from the descriptive information; and
   a value function comprising predetermined variables that correspond to one of the extracted information, user preferences, and combination thereof.

2. The system of claim 1, wherein the server comprises means for automatically updating the address list at predetermined times.

3. The system of claim 1, wherein the client further comprises means for automatically updating the list of user preferences after an occurrence of a predetermined event.

4. The system of claim 1, wherein the client further comprises re-evaluation means for selecting at least a third data source if the third data source is determined by the re-evaluation means to be preferred over the second data source.

5. The system of claim 1, wherein the server is remotely located on a global computer network, and wherein the means for accessing the server is through FTP (file transfer protocol).

6. The system of claim 1, wherein the first data source is a structured web document from a descriptive server remotely located on a global computer network, and wherein the second data source is a data stream of a data stream server remotely located on the global computer network.

7. The system of claim 6, wherein the means for accessing the first data source is HTTP (hypertext transfer protocol), and wherein the means for accessing the second data source is RTSP (real time streaming protocol).

8. The system of claim 6, wherein the descriptive server is associated with a network radio station and wherein the data stream is a musical piece.

9. The system of claim 8, wherein the list of user preferences comprises a list of songs that are indexed based on the preference of the user.

10. The system of claim 9, wherein the evaluation means of the client comprises a value function, wherein the value function is defined at least by one of a variable that refers to an index of a song in the list of user preferences, a variable that refers to a time that has elapsed since a given song in the list was last accessed, and a combination thereof.

11. The system of claim 6, wherein the descriptive server is associated with a network broadcast station and wherein the data stream is a live sporting event.

12. The system of claim 11, wherein the list of user preferences comprises one of a list of players and a corresponding player preference score for each player in the list, a list of teams and a corresponding team preference score in the list, and a combination thereof.

13. The system of claim 12, wherein the evaluation means of the client comprises a value function, wherein the value function comprises at least one variable that refers to a current statistic of the sporting event and a variable that refers to a user preference score in the list of user preferences.

14. A method for automatically accessing preferred information data streams, comprising the steps of:
   accessing an address list from a server, the address list comprising addresses of a plurality of data sources;
   accessing a descriptive page from each of the plurality of data sources using the addresses;
   extracting relevant information from each of the accessed descriptive pages;
   evaluating the extracted information to select a first preferred data source; and
   accessing at least one information data stream that is associated with the first preferred data source, wherein the evaluating step comprises the steps of:
   accessing a list of user preferences; and
   applying the user preferences and extracted information to a value function to compute a preference value for each of the data sources; wherein the first preferred data source is the data source having the greatest preference value.

15. The method of claim 14, further comprising the step of automatically updating the address list at predetermined times.

16. The method of claim 14, further comprising the steps of:
   evaluating the at least one accessed information data stream to determine if re-selection criteria has been met; and
   re-evaluating the extracted information if the re-selection criteria is determined to be met; and
   selecting a second preferred data source if the second preferred data source is determined to be preferred over the first preferred data source.

17. A program storage device readable by a machine, tangibly embodying a program of instructions executable by the machine to perform method steps for automatically accessing preferred information data streams, the method steps comprising:
   accessing an address list from a server, the address list comprising addresses of a plurality of data sources;
   accessing a descriptive page from each of the plurality of data sources using the addresses;
   extracting relevant information from each of the accessed descriptive pages;
   evaluating the extracted information to select a first preferred data source; and
   accessing at least one information data stream that is associated with the first preferred data source,
   wherein the instructions for performing the evaluating step comprise instructions for performing the steps of:
   accessing a user list of user preferences; and
   applying the user preferences and extracted information to a value function to compute a preference value for each of the data sources; wherein the first preferred data source is the data source having the greatest preference value.

18. The program storage device of claim 17, further comprising instructions for performing the steps of:
   evaluating the at least one accessed information data stream to determine if a re-selection criteria has been met; and
   re-evaluating the extracted information if the re-selection criteria is determined to be met; and
   selecting a second preferred data source if second preferred data source is more preferred than the first preferred data source.

* * * * *